US006142658A

United States Patent [19]

Reiss

[11] Patent Number: 6,142,658

[45] Date of Patent: Nov. 7, 2000

[54] MOTOR VEHICLE HEADLIGHT WITH A TRANSVERSE SOURCE CAPABLE OF EMITTING A BEAM WITH A SHARP CUT-OFF

[75] Inventor: Benoît Reiss, Paris, France

[73] Assignee: Valeo Vision, Bobigny Cedex, France

[21] Appl. No.: 09/238,865

[22] Filed: Jan. 27, 1999

[30] Foreign Application Priority Data

Jan. 28, 1998 [FR] France .................................. 98 00905

[51] Int. Cl.[7] ...................................................... B60Q 1/00

[52] U.S. Cl. .......................... 362/516; 362/297; 362/217; 362/346; 362/518

[58] Field of Search .................................... 362/518, 508, 362/516, 346, 299, 297, 309, 217

[56] References Cited

U.S. PATENT DOCUMENTS

| | | | |
|---|---|---|---|
| 4,697,225 | 9/1987 | Lindae et al. | 362/518 |
| 4,731,713 | 3/1988 | Perthus | 362/518 |
| 4,794,493 | 12/1988 | Luciani | 362/516 |
| 4,827,367 | 5/1989 | Luciani . | |
| 4,964,021 | 10/1990 | Masin | 362/518 |

FOREIGN PATENT DOCUMENTS

| | | |
|---|---|---|
| 1 444 791 | 10/1966 | France . |
| 2 602 305 | 2/1988 | France . |
| 92/08076 | 5/1992 | WIPO . |
| 97/06454 | 2/1997 | WIPO . |

OTHER PUBLICATIONS

"Macrofocal Conics as Reflector contours", Spenser et al, Journal of the Optical Society of America, vol. 55, No. 1, Jan. 1965.

French Search Report dated Aug. 4, 1998.

*Primary Examiner*—Thomas M. Sember
*Attorney, Agent, or Firm*—Morgan & Finnegan LLP

[57] ABSTRACT

A motor vehicle headlight comprises a light source having a given geometry, a mirror and a lens. The mirror co-operates with the source to generate a beam delimited by a cut-off at least part of which is horizontal. The source has the general shape of a cylinder having a horizontal axis perpendicular to an optical axis and a length less than the width of the mirror. At least one vertical section of the mirror has a profile such that a ray emitted tangentially by an edge of the source is reflected parallel to the optical axis and rays emitted by the rest of the source are reflected downwards relative to the optical axis. The mirror has at the height of the source a horizontal section adapted to assure a predetermined horizontal distribution of light.

16 Claims, 9 Drawing Sheets

MOTOR VEHICLE HEADLIGHT WITH A TRANSVERSE SOURCE CAPABLE OF EMITTING A BEAM WITH A SHARP CUT-OFF

FIELD OF THE INVENTION

The invention relates in general to motor vehicle headlights.

BACKGROUND OF THE INVENTION

At present headlights of the parabolic mirror type or with a surface capable of self-generation of a cut-off beam (in particular a dipped beam or fog-lamp beam) generally have, at least in the case of the mirror, a width which is considerably greater than the height.

There are a number of considerations which go to explain this. First, motor vehicle manufacturers have a tendency to manufacture vehicles which are ever more aerodynamic, and an important factor in aerodynamic design is a general shape which tapers towards the front with a sloping bonnet, and the height of the space provided at the front of the vehicle, where the headlights are located, is consequently becoming smaller and smaller.

In parallel with this, a good light output requires that a reflecting surface of considerable area be maintained, and because the height of the headlights is reduced, this area can only be obtained in a lateral direction.

Apart from this, obtaining a light beam of good quality, in particular if it is to provide a point of concentration on the axis of the road, requires that the beam be formed with a significant proportion of small images of the light source (typically the filament of an incandescent lamp or the arc of a discharge lamp), and this requires that a mirror be designed with areas which extend as far as possible from the source, although in practice these areas can only extend away from the light source in a lateral direction, for the reasons of overall size previously mentioned.

As a corollary to this, traditional headlights with this type of contour work best with a light source which is oriented axially, this orientation contributing to the overall light yield and, with mirrors which are highly elongate laterally, creating a large proportion of images on a projection screen which are slightly inclined to the horizontal. This is well-suited to obtaining beams with a sharp cut-off and substantial lateral spread.

By contrast with the general trend over a good number of years, there is now a demand from manufacturers for headlights with a width equal to or less than their height.

With headlights of traditional optical design this new type of contour causes a number of problems.

First, with an axial source the resulting substantial height of the mirror above and below the light source will result in a substantial proportion of images strongly inclined to the horizontal, i.e. slightly inclined to the vertical, which in the first place will contribute to deterioration of the quality of the cut-off, secondly will light up the roadway too close to the vehicle and thirdly will cause problems with obtaining a beam of satisfactory width.

A fog-lamp has already been proposed, in particular in document FR-A-2 602 305 in the Applicant's name, which features a transverse light source and a mirror which can have a height greater than its width.

This known headlight nevertheless still has certain disadvantages with regard to the distribution of images of the source. FIG. 1 of the drawings represents a vertical axial section of the reflecting surface described in the above document.

This section is defined in its upper part by a section of a parabola 20*h* with its focus at a fixed point Fh (or "top focus") behind the filament 10 and in its lower part by another section of a parabola 20*b* with its focus at another fixed point Fb (or "bottom focus") in front of the filament 10. Such sections inevitably lead to images of the filament which are delimited at the top by a horizontal cut-off defined by the intersection of the y—y axis with a projection screen, as shown at "C" in FIG. 1 (this is the case in particular with an image I1 emitted by the upper part of the mirror), and which are excessively inclined downwards relative to the cut-off C (this is the case in particular with an image I2 produced by a middle area of the lower part of the mirror).

Accordingly, the resulting cut-off offers considerable scope for improvement.

In addition to this, the headlight described in the above document is uniquely well-suited to creating a fog-lamp beam with a flat cut-off and there is nothing in the above document to indicate or suggest a way in which a beam might be created with a more complex cut-off, in particular a dipped beam of the European or American type.

In addition to this, the mirror described above is unable in itself to provide a light beam of any substantial width, and it is therefore impossible to use a lens which has optical elements for spreading the light, something which is frequently desired by motor vehicle stylists, however.

SUMMARY OF THE INVENTION

The invention accordingly seeks to improve the limitations of the prior art and to provide a headlight with a mirror which can have a width smaller than that of conventional headlights and a height at least equal to its width, and which is therefore free of all such limitations.

Accordingly, the invention proposes motor vehicle headlight comprising a light source, a mirror and a lens, the mirror being adapted to co-operate with the source to produce a beam delimited by a cut-off at least a part of which extends horizontally, wherein the source has the general shape of a cylinder, the axis of which is essentially horizontal and perpendicular to an optical axis of the mirror and the length of which along the axis is significantly less than the width of the mirror; at least one vertical section of the surface of the mirror has a profile such that a light ray emitted tangentially by an edge of the source is reflected parallel to the optical axis, light rays emitted by the rest of the source being reflected with a downward inclination relative to the optical axis.

Preferred but non-limiting features of the headlight according to the invention are as follows:

the mirror has a height at least equal to its width.

the ratio between the height and the width of the mirror is in the range 1.2:1 to 4:1.

at least one area of the reflective surface of the mirror is generated by moving the vertical section along a given horizontal generatrix consisting of a part of the horizontal section corresponding to that area.

the vertical section is moved in translation without rotation.

the horizontal generatrix is smooth.

the horizontal generatrix has discontinuities in its slope.

at least locally the horizontal generatrix is a section of a parabola.

at least locally the horizontal generatrix is a straight line.

the mirror is subdivided into a plurality of areas at least one of which has the aforementioned vertical section.

at least one of the areas of the mirror has a vertical section which has a profile such that an imaginary light ray emitted tangentially by a imaginary contour is reflected parallel to the optical axis, imaginary light rays emitted by the rest of the contour being reflected with a downward inclination relative to the optical axis.

said imaginary contour is a cylinder having a diameter different to that of said source.

the imaginary contour encompasses the source the source is an incandescent filament.

Further features, aims and advantages of the invention will appear more clearly on reading the following detailed description of preferred embodiments, which is given by way of non-limiting example only and with reference to the accompanying drawings.

DESCRIPTION OF A PREFERRED EMBODIMENT OF THE INVENTION

Figure 2:
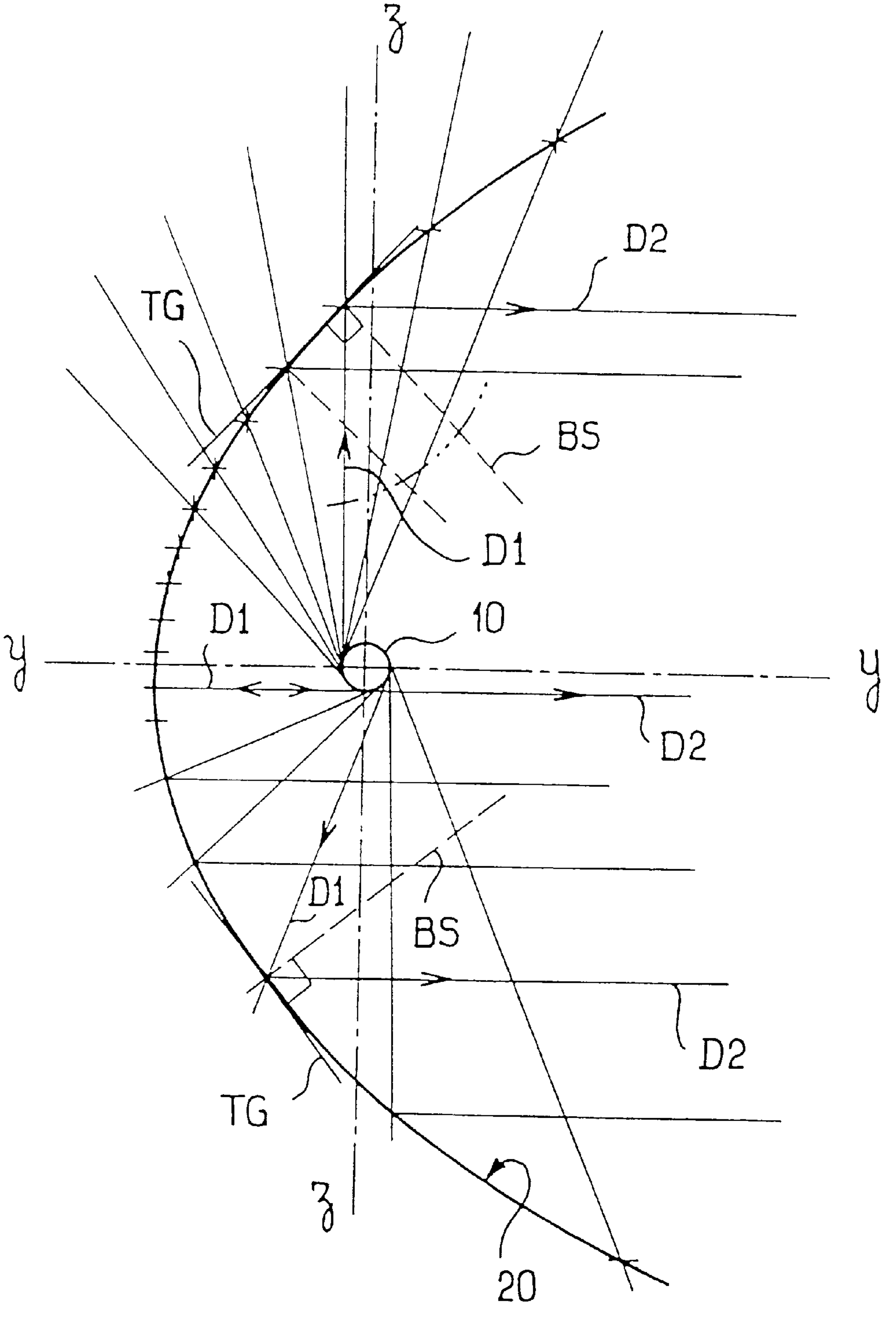
FIG. 2 is a schematic view in a vertical axial section of a transverse filament and a mirror according to the invention.
Figure 3:
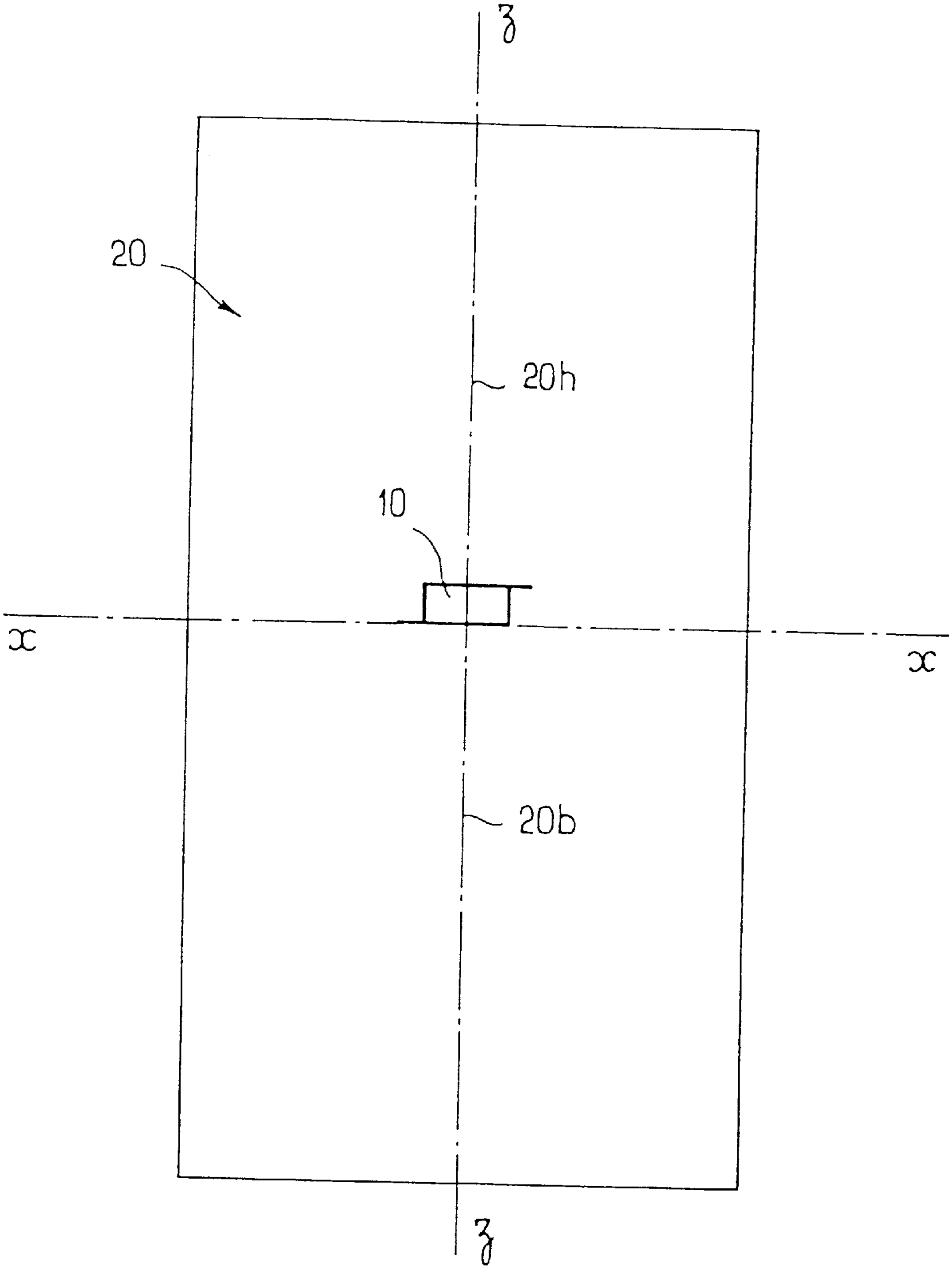
FIG. 3 is a front view of the filament and the mirror from FIG. 2.

FIGS. 2 and 3 show components of the headlight of a motor vehicle, namely the filament 10 of the bulb, which is generally cylindrical in shape, and its mirror 20. The other components of the headlight, namely the housing, the lens and various ancillary items of equipment, are not shown and are conventional in themselves. The light source may instead be the arc of a discharge lamp, which is generally cylindrical in shape.

According to a first important feature of the invention, the axis of the filament 10 is horizontal and perpendicular to the optical axis y—y of the mirror. This filament is typically either the transverse filament of a standardized lamp H3 mounted axially at the base of the mirror or the axial filament of a lamp H1 or H7 mounted laterally in the mirror.

According to an essential feature of the invention, the top and bottom vertical generatrices 20*h* and 20*b* of the mirror 20 are designed in such a way as to bring all the images of the filament 10 to the horizontal level to produce good quality beams with a clean cut-off, as described in detail hereinafter.

More precisely, and referring in particular to FIG. 2, the generatrices are created by drawing straight lines D1 tangential to the surface of the filament 10, these straight lines being to the rear of the filament in the case of the upper generatrix 20*h* and in front of the filament in the case of the generatrix 20*b*.

Associated with each of these straight lines D1, corresponding to a light ray emitted by an edge of the filament strip 10, are respective straight lines D2 parallel to the optical axis y—y of the mirror, which is itself essentially parallel to the axis of the vehicle.

For each pair of straight lines (D1, D2), a bisecting line BS and a straight line TG perpendicular to this bisecting line are defined.

Each generatrix is constructed step by step, starting from the base of the mirror 20, which is fixed at a predetermined distance from the filament, and on the basis of the various straight lines TG obtained, in order to define a curve which is referred to hereinafter as the "evolutive generatrix" in that it does not have a fixed focus but rather a set of foci which evolve progressively along said generatrix. These generatrices are distinguished from the fixed-focus, i.e. parabolic, generatrices described with reference to FIG. 1.

By varying the horizontal distance between the base of the mirror 20 and the filament 10 it is possible to design generatrices 20*h*, 20*b* which are more or less open or closed around the source, and therefore to vary the size of the images of the filament and the quantity of light which the mirror picks up at a given height.

The differential equation for the generatrices 20*h* and 20*b*, which is easy to solve using computer-aided calculation means, can be expressed in the following manner:

$$\ddot{A}z=\ddot{A}b.(z.\sin\hat{a}-y.\cos\hat{a})$$

$$\ddot{A}y=\ddot{A}z.\tan(\hat{a}/2)$$

with the initial conditions:

$$z=-Rfil$$

$$y=-F$$

where:

(y,z) are perpendicular axes with the origin at the center of the filament 10, y being the horizontal optical axis and z being vertical, Rfil is the radius of the filament, and F is the distance along y between the center of the filament and the back of the mirror.

Because of this design of the generatrices 20*h*, 20*b*, each image of the filament 10 which they produce is located immediately below and on a level with a horizontal cut-off passing through the axis y—y.

Taking this as a starting point, it is possible to produce different types of beams, the width of which in particular can be varied by varying the horizontal generatrix of the reflecting surface of the mirror 20.

In a basic embodiment, this horizontal generatrix is a parabola with a focus which is either centered on the filament 10 or preferably offset laterally relative to the filament, and the vertical generatrix described above is slid along this horizontal generatrix, this sliding consisting in translation of said vertical generatrix along the horizontal generatrix without rotation (i.e. so that it remains parallel to the plane y0z).

In this case, the equation for the horizontal generatrix may be expressed as follows, for example:

$$y=0.25.[x+|x|/x.Lfil.|z|/(2.z)^2/(F+\ddot{a}F)]-F$$

where:

x,y,z are the co-ordinates of the current point;

F is the basic focal length described above in respect of the vertical generatrix;

äF is the lateral offset of the axis of the parabolic horizontal generatrix relative to the center of the filament; and Lfil is half the length of the filament measured along x.

Figure 1:
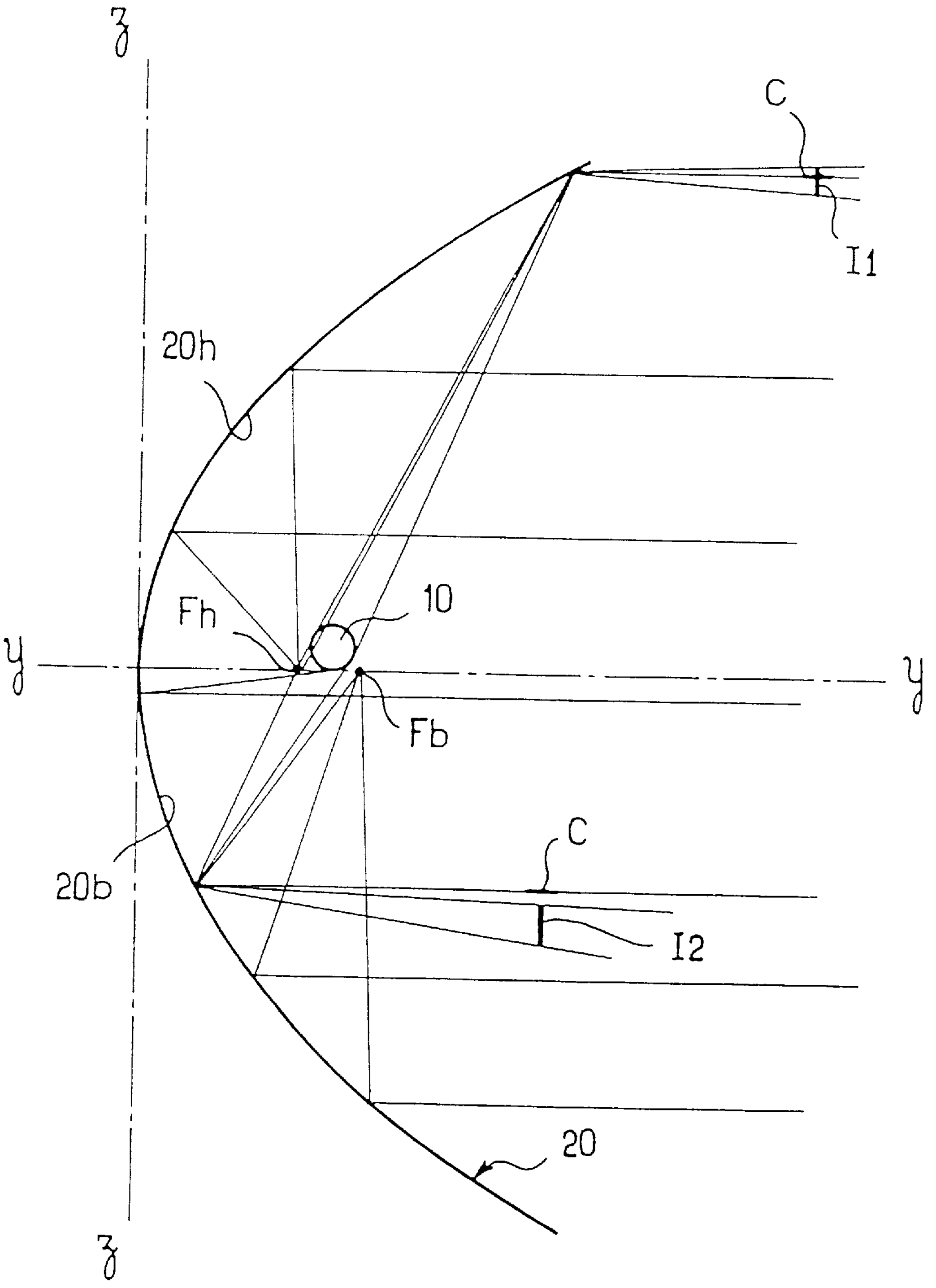
FIG. 1 is a schematic view in vertical axial section of a transverse filament and a mirror of the prior art.
Figure 4:
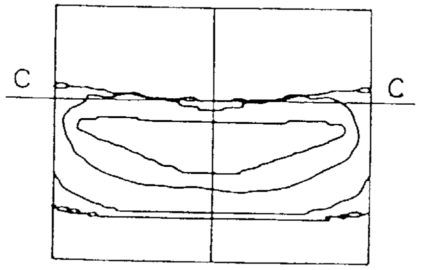
FIGS. 4 and 5 respectively illustrate, by means of isocandela curves, the light distribution obtained in principle with the prior art solution from FIG. 1 and with the approach adopted by the present invention.

FIG. 4 shows, by means of isocandela lines, the general shape of a beam obtained with the vertical parabolic half-generatrices from FIG. 1, and it can be seen, in particular in the central area, that there is a lack of light immediately below the cut-off c—c, which is explained by the presence in this area of images of the filament the highest point of which is offset downwards relative to the cut-off and in the lateral areas by an overspill of light from above the cut-off, which is in turn explained by the presence of images the highest point of which is located above this cut-off.

Figure 5:
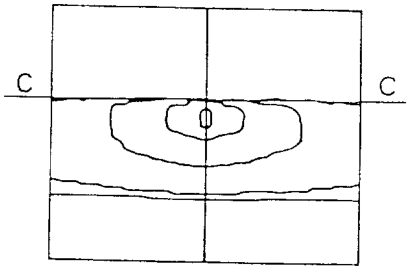

By contrast FIG. 5, which shows the shape of a beam obtained with the generatrix according to the invention shown in FIG. 2 and with a horizontal generatrix consisting of left and right half-parabolas respectively focused in the vicinity of the left and right ends of the filament 10, shows that the cut-off c—c is defined over practically the whole width of the beam.

Figure 6:
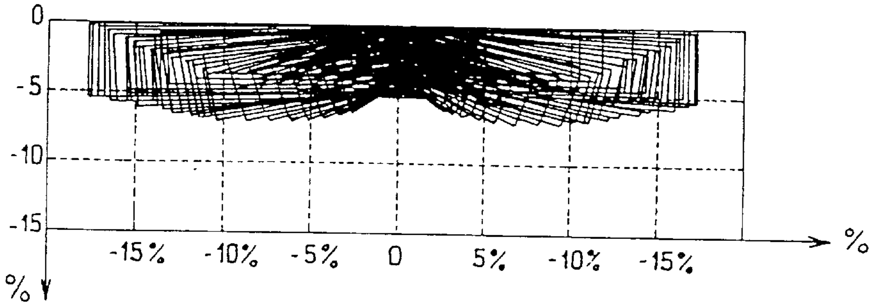
FIGS. 6 and 7 illustrate, by means of images of the light source, the optical behavior of the upper and lower halves of the mirror from FIG. 3.
Figure 7:
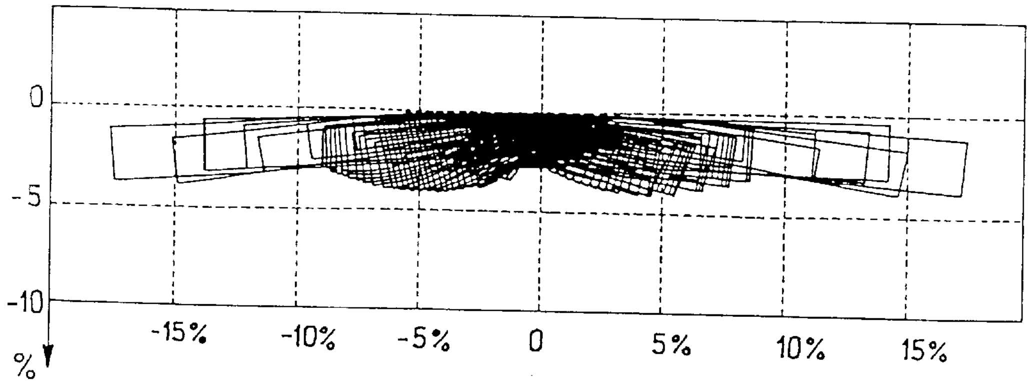

FIGS. 6 and 7 show the traces of images obtained with a mirror as defined above, in terms of horizontal generatrix and vertical generatrix, for a defocusing äF approximately equal to half the length of the filament, being about 2 mm for a filament 4 mm long and a mirror 150 mm high and 80 mm wide, with the filament 10 at mid-height. Note that in these figures the horizontal images of the filament are all immediately below the cut-off (i.e. the 0% horizontal level), while the inclined images are positioned with their highest point located essentially on the cutoff.

Note also that, despite the specific vertically extended shape of the mirror there is no other large image inclined to the horizontal likely to light up the road too close to the vehicle.

Figure 8:
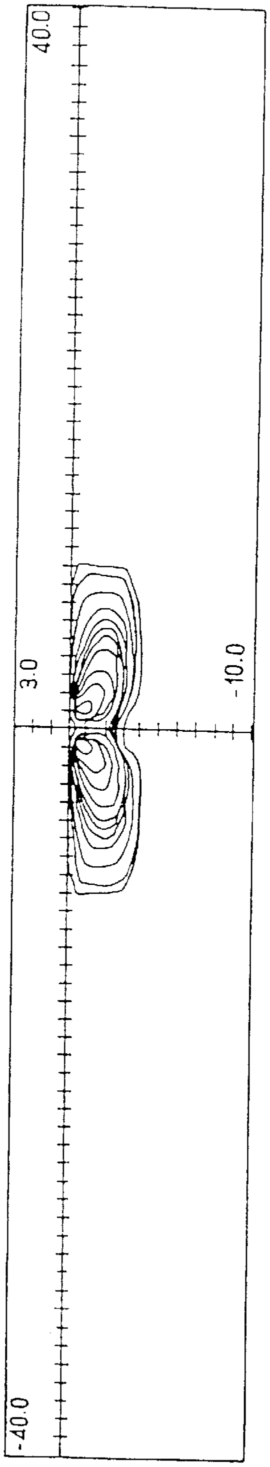
FIGS. 8 and 9 illustrate, by means of groups of isocandela lines on a projection screen, the optical behavior of the upper and lower halves of the mirror from FIG. 3.
Figure 9:
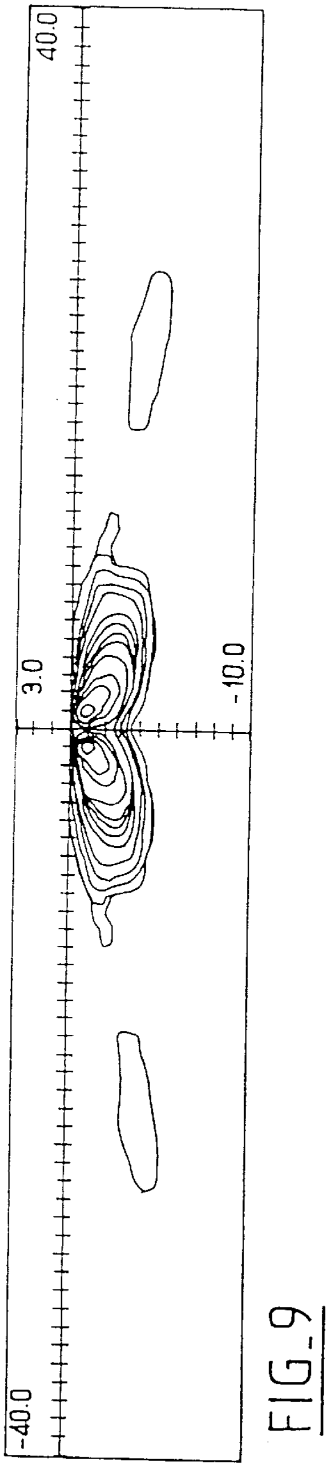
Figure 10:
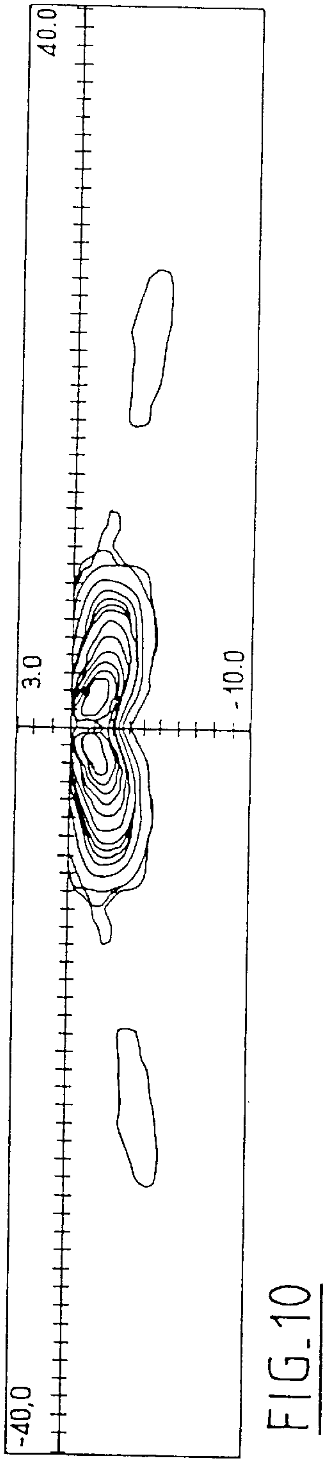
FIG. 10 illustrates, by means of a group of isocandela lines, the optical behavior of the whole of this mirror.

The corresponding isocandela curves are shown in FIGS. 8 and 9 and FIG. 10 shows the shape of the whole beam.

Providing the headlight lens with striations extending laterally, and with prisms if applicable, creates a fog-lamp beam which is entirely satisfactory or a dipped beam which conforms to U.S. standards.

Although generating a reflective surface by translating the vertical generatrix shown in FIG. 2 along a given horizontal generatrix without rotating it is described above, it is clearly possible to use any other appropriate technique for this purpose. In particular, the vertical generatrix in FIG. 2 can be slid along the horizontal generatrix, rotating its plane so that at all points on the horizontal generatrix it can be located for example in a vertical plane containing the ray reflected at that point of said horizontal generatrix, or in a vertical plane containing the normal vector at this point of said horizontal generatrix. It is equally possible to use a vertical generatrix which evolves as a function of its position along the horizontal generatrix, this change being obtained, for example, by redesigning the vertical generatrix in accordance with the principles explained with reference to FIG. 2 for each of its positions along the horizontal generatrix.

A detailed description will now be given of a mirror defined with the vertical generatrix described above with reference to FIG. 2, but capable of creating a broad beam on its own, i.e. without the intervention of the lens, which beam may be, depending on the circumstances, a fog-lamp beam or a dipped beam conforming in particular with European and American standards.

A mirror for a fog-lamp beam can be obtained using a horizontal generatrix consisting of a straight line perpendicular to the y—y axis. The mirror then has a cylindrical reflective surface with the property of producing images of the filament which are all located below and at the level of the cut-off and which at the same time are strongly offset laterally in relation to the center of the beam.

In this case, for modulating the width of the beam it is of course possible to consider any other curve between the parabola described above and the aforesaid straight line, preferably a derived curve or even a curve derived twice.

It is important to note here that with a vertical generatrix according to the invention the thickness of the beam is independent of the height of the mirror. In fact, the further the mirror is extended upwards or downwards, the smaller the images of the filament, these images remaining aligned below the cut-off. Thus the height of the mirror can be varied to control the concentration of light immediately below the cut-off.

Figure 11:
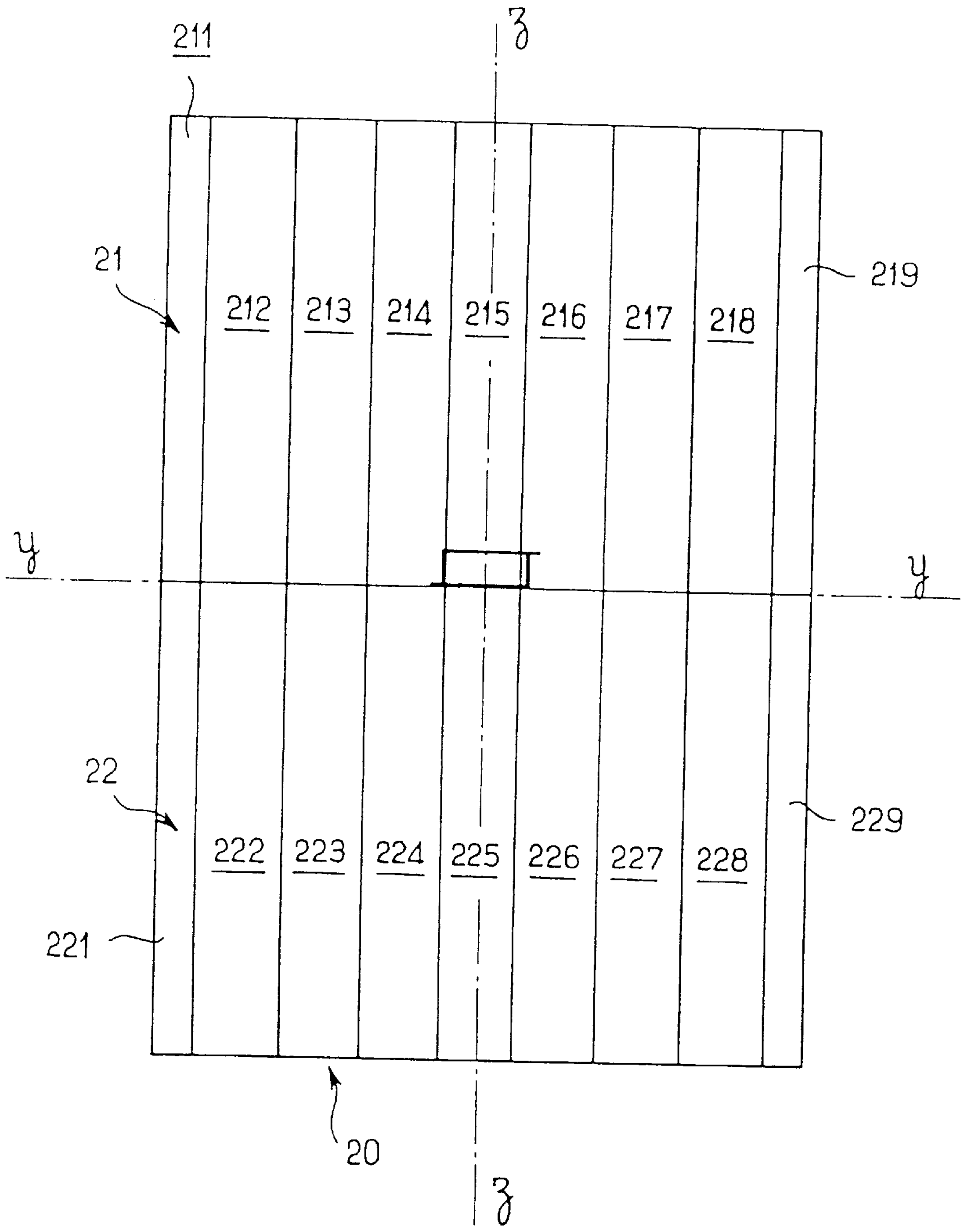
FIG. 11 is a front view of a specific embodiment of a mirror suitable for producing a particular type of cut-off beam.
Figure 12:
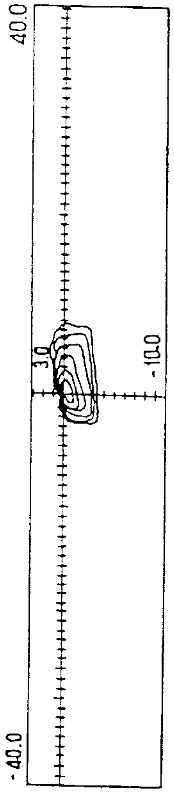
FIGS. 12 to 25 illustrate, by means of respective groups of isocandela lines, the optical behavior of the mirror from FIG. 11, sub-area by sub-area, area by area and in its entirety.
Figure 13:
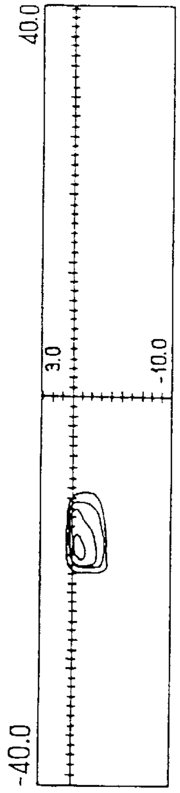
Figure 14:
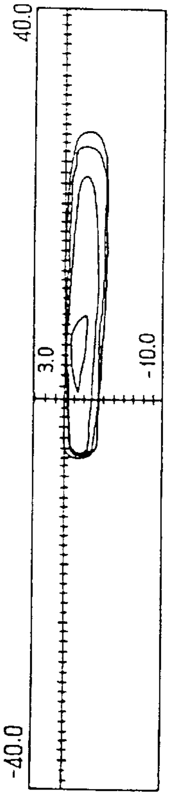
Figure 15:
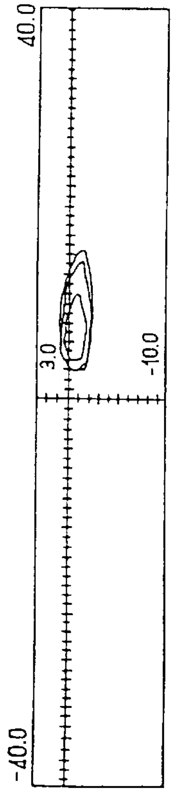
Figure 16:
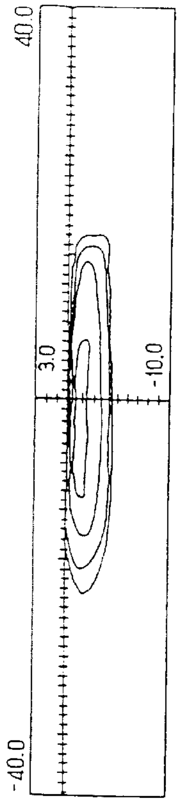
Figure 17:
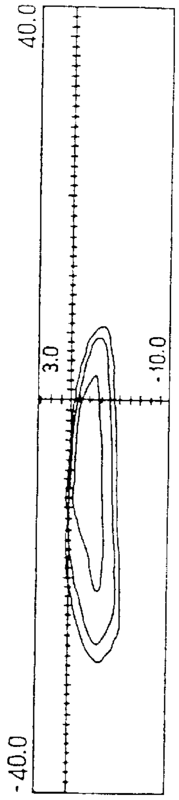
Figure 18:
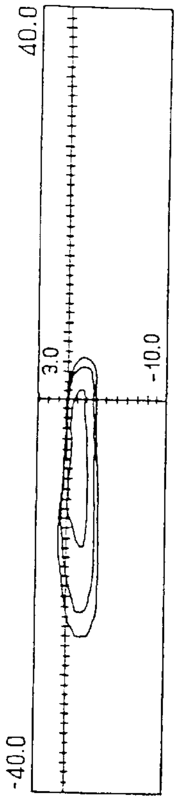
Figure 19:
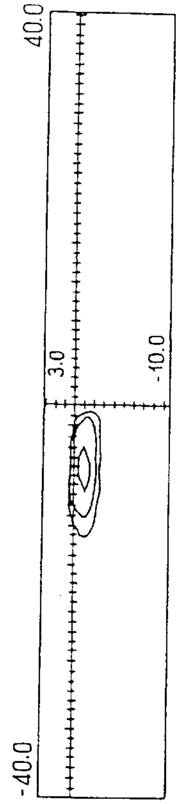
Figure 20:
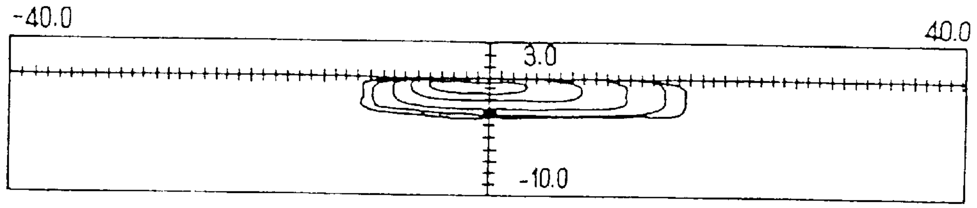

A dipped beam which conforms to European regulations is preferably produced by dividing the mirror 20 into different areas as shown in FIG. 11.

In this figure the mirror has an upper half 21 and a lower half 22, each of which comprises nine areas, respectively 211 to 219 and 221 to 229.

In the example shown, the varous areas have similar widths, typically in the range 6 mm to 13 mm, and are characterised essentially by different horizontal generatrices, defined according to the required lateral offset and spread of the light.

Accordingly, the central areas 215 and 225, which produce images of the filament 10 which are horizontal or very slightly inclined to the horizontal, are intended to provide the horizontal cut-off over a substantial distance. Their horizontal generatrix is advantageously a straight line.

Given their positions, the areas 214 and 226 produce images of the filament which are parallel to or slightly inclined to the 15° half-cut-off typical of a European dipped beam. It is for this reason that these areas are used to produce a part of the beam located immediately below this inclined half-cut-off, and which defines it. To be more precise, the position of the images of the filament produced by these two areas can be corrected so that they are significantly below the inclined half-cut-off in various ways:

- using inclined prisms in the headlight lens in line with the areas 214, 226 to place these images along the half-cut-off;
- using similar prisms projected directly onto the surface of the areas 214, 226;
- finally, modifying the position of the foci of the horizontal and vertical generatrices on these surfaces to produce the same phenomenon; in particular, parabolic horizontal generatrices can advantageously be used with the foci in positions offset laterally relative to the center of the filament, to control the displacement of the images along the inclined half-cut-off.

The other areas of the mirror are used to ensure a satisfactory distribution of the light in the various areas of the beam. To do this, the horizontal generatrices of these areas are modified case by case and are preferably the same for the upper area and for the lower area to avoid any discontinuity liable to cause optical defects.

Note that, if the generatrices of the various adjacent areas are linked to one another in a continuous manner (but not necessarily derivably), then the surface of the mirror is likewise continuous in that the surface is created by causing the vertical generatrix to slide along the horizontal generatrix.

Note also that if the central areas 215, 225 have the vertical generatrix described with reference to FIG. 2, the other areas may have surfaces of different types, according to their function and in particular surfaces derived from the teachings of documents FR-A-2 536 502, FR-A-2 536 503, FR-A-2 602 305, FR-A-2 602 306, FR-A-2 609 146, FR-A-2 609 148, FR-A-2 639 888, FR-A-2 664 677 and FR-A-2 710 393 in the name of Applicant.

In addition to this, given the inherent characteristics of the mirrors according to the invention, which produce a thin beam, it may be useful if certain areas, and preferably areas which produce relatively large images of the filament, produce images located appreciably lower than the cut-off, in order to fill in any "black hole" between the vehicle and the part of the road exposed to the beam, such black holes being a source of visual discomfort if very marked.

In practical terms, each of the areas of the mirror is defined allowing for at least some of the following parameters:

the basic focal length (parameter F) of the vertical generatrix;

defocusing of the generatrix, i.e. using an imaginary circular or non-circular contour different from the real contour of the source to produce the generatrix;

the form and curvature of the horizontal generatrix, and in particular the lateral offset of its axis as indicated above;

the tilt of the surface (typically obtained by changing the rectangular axes);

locating the surface in the mirror, which typically focuses the horizontal generatrix on one lateral face or the other of the filament 10;

the dimensions of the filament 10.

In one embodiment of the invention, it is possible to construct the vertical generatrix of some areas not on the basis of the true contour of the source, which is typically circular, but on the basis of an imaginary contour, and in particular a circle which is larger or smaller than the effective cross-section of the filament. This varies the position of the images relative to the cut-off and in particular enables a less sharp cut-off to be obtained, which is desirable in some cases. In addition to this, if some images are displaced downwards while others remain below the cut-off it is possible to thicken the beam and/or to displace its area of maximum concentration downwards.

Figure 21:
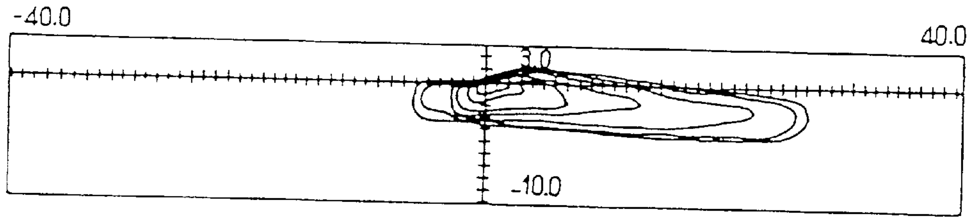
Figure 22:
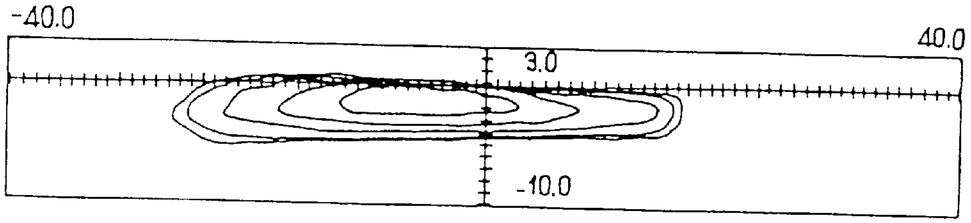

FIGS. 12 to 20 illustrate, by means of sets of isocandela curves, the parts of the beam respectively produced by the areas 214, 213, 212, 211, 216, 217, 218, 219 and 215 of the mirror in FIG. 11, while FIGS. 21 and 22 respectively illustrate the effect of superimposing the parts of the beam from FIGS. 12 to 15 and the parts of the beam from FIGS. 16 to 19.

Figure 23:
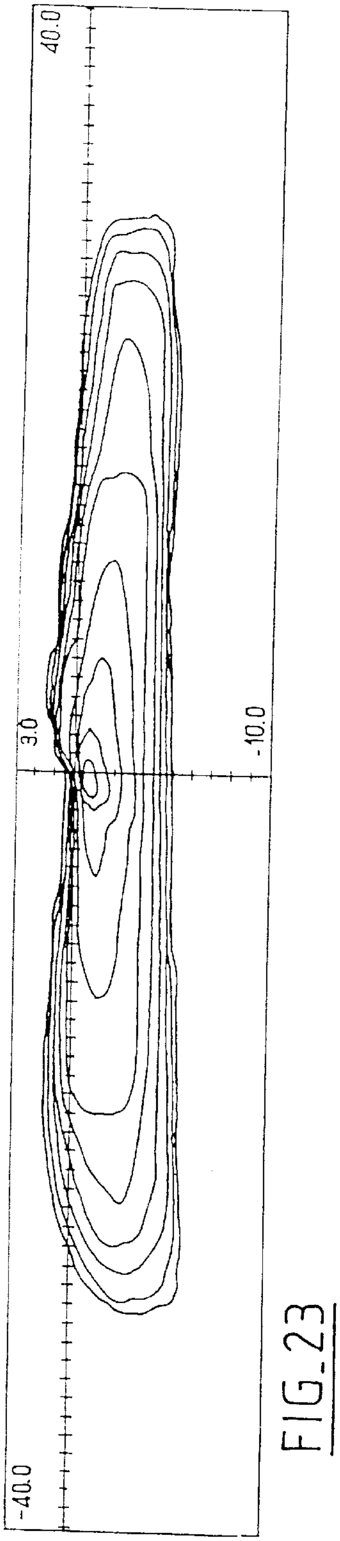
Figure 24:
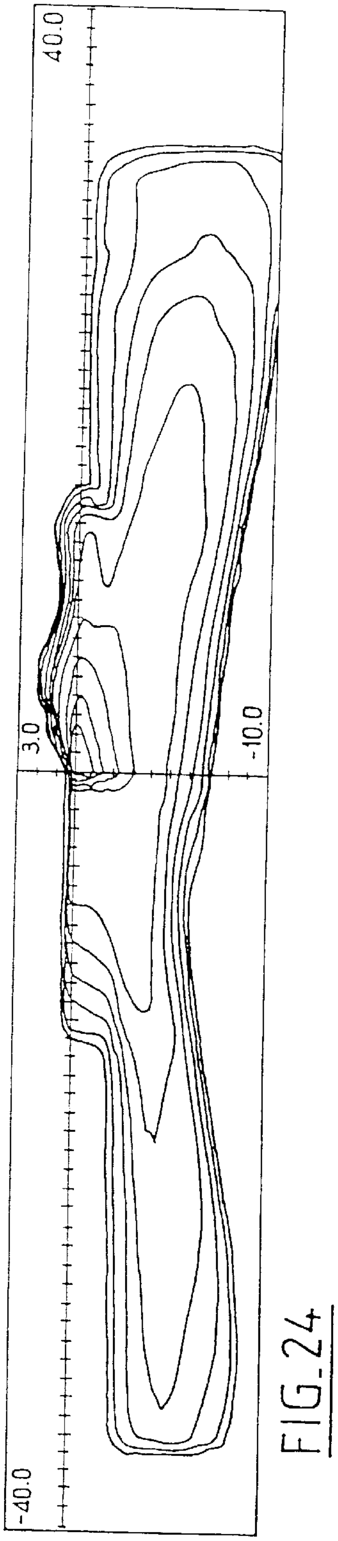

FIG. 23 illustrates the shape of the part of the beam produced by the upper half of the mirror in FIG. 11 and FIG. 24 illustrates the shape of the part of the beam produced by the lower half.

Figure 25:
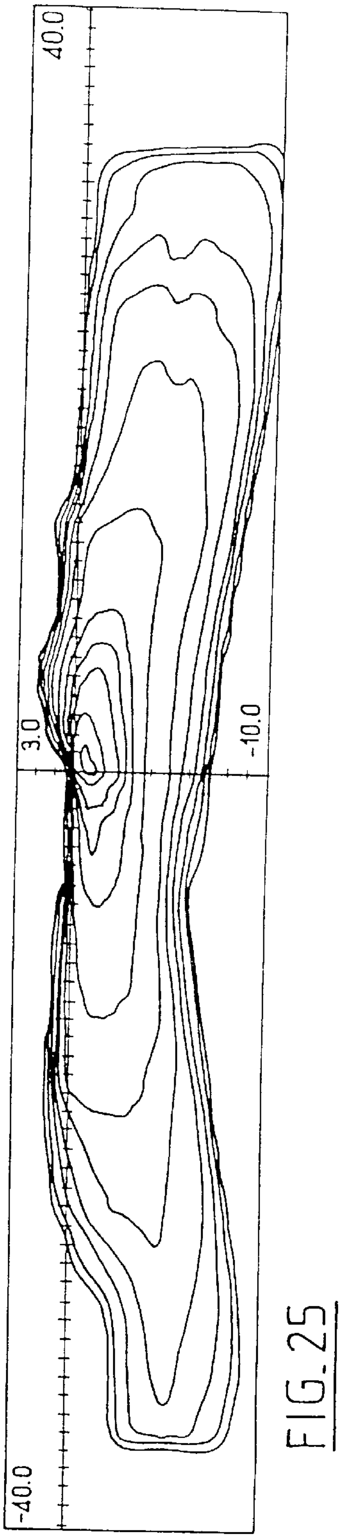

FIG. 25 illustrates the overall shape of the beam. It can be seen that this beam has all the qualities required in terms of width, thickness and concentration on the axis of the road.

By using a transverse source and the vertical generatrices described above the invention provides mirrors which are capable in themselves, or in conjunction with optical elements on the lens, of providing headlights in which the width is appreciably less than the height. The ratio between the height and the width is typically in the range 1.2:1 and 4:1.

Clearly, this invention is in no way limited to the embodiments described above and shown in the drawings, and the skilled person will be capable of applying thereto any variant or modification within the spirit of the invention.

In particular, while the foregoing description relates to mirrors featuring vertical lateral edges and horizontal top and bottom edges, it is evident that the above teachings apply equally to a mirror with oblique edges.

What is claimed is:

1. A motor vehicle headlight comprising a light source, a mirror and a lens, said mirror being adapted to co-operate with said source to produce a beam delimited by a cut-off, a part of which extends horizontally, wherein said source has the general shape of a cylinder having an axis that is essentially horizontal and perpendicular to an optical axis of said mirror and the length of the source along said axis is significantly less than the width of said mirror, said mirror having a surface divided into a plurality of substantially parallel vertical sections, at least one vertical section having a profile such that a light ray emitted tangentially by an edge of said source is reflected substantially parallel to said optical axis, and light rays emitted by the rest of said source being reflected with a downward inclination relative to said optical axis.

2. A headlight as claimed in claim 1 wherein said mirror has a height at least equal to its width.

3. A headlight as claimed in claim 2 wherein the ratio between the height and the width of said mirror is in the range 1.2:1 to 4:1.

4. A headlight as claimed in claim 1 wherein a part of the reflective surface of said mirror is generated by moving said at least one vertical section along a given horizontal generatrix consisting of a part of said horizontal section corresponding to said area.

5. A headlight as claimed in claim 4 wherein said vertical section is moved in translation without rotation.

6. A headlight as claimed in claim 4 wherein said horizontal generatrix is smooth.

7. A headlight as claimed in claim 6 wherein said horizontal generatrix is a section of a parabola.

8. A headlight as claimed in claim 6 wherein said horizontal generatrix is a straight line.

9. A headlight as claimed in claim 4 wherein said horizontal generatrix has discontinuities in its slope.

10. A headlight as claimed in claim 4 wherein said horizontal generatrix has a set of foci which evolve progressively.

11. A headlight as claimed in claim 1 wherein said surface of said mirror is subdivided into a plurality of areas, at least one of which has said at least one vertical section.

12. A headlight as claimed in claim 11 wherein at least one of said plurality of areas of said mirror has a vertical section which has a profile such that an imaginary light ray emitted tangentially by an imaginary contour is reflected parallel to said optical axis, imaginary light rays emitted by the rest of said contour being reflected with a downward inclination relative to said optical axis.

13. A headlight as claimed in claim 12 wherein said imaginary contour is a cylinder having a diameter different to that of said source.

14. A headlight as claimed in claim 13 wherein said imaginary contour encompasses said source.

15. A headlight as claimed in claim 1 wherein said source is an incandescent filament.

16. A headlight at claimed in claim 1 wherein the width of said at least one vertical section is in the range of 6 mm to 13 mm.

* * * * *